June 10, 1930.  J. A. SCHOENBERG ET AL  1,763,542
TRUCK
Filed April 16, 1928   3 Sheets-Sheet 1
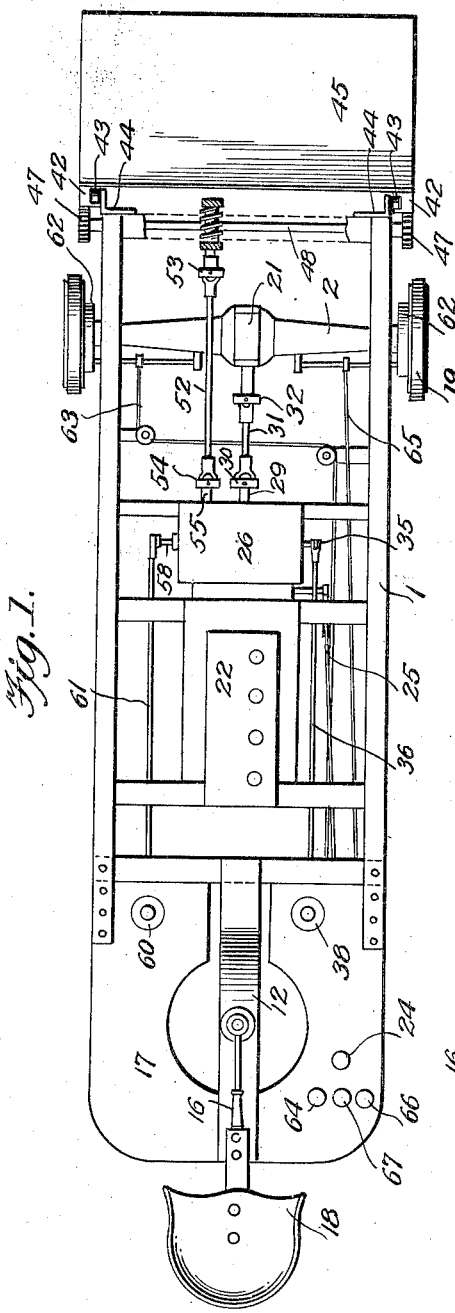
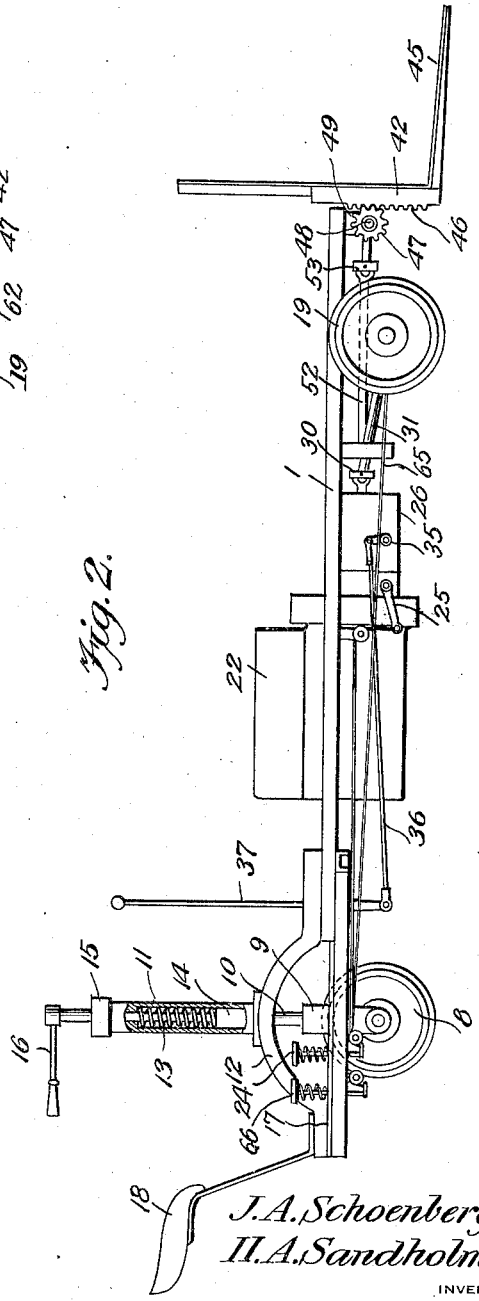
J. A. Schoenberg
H. A. Sandholm
INVENTORS
BY Victor J. Evans
ATTORNEY

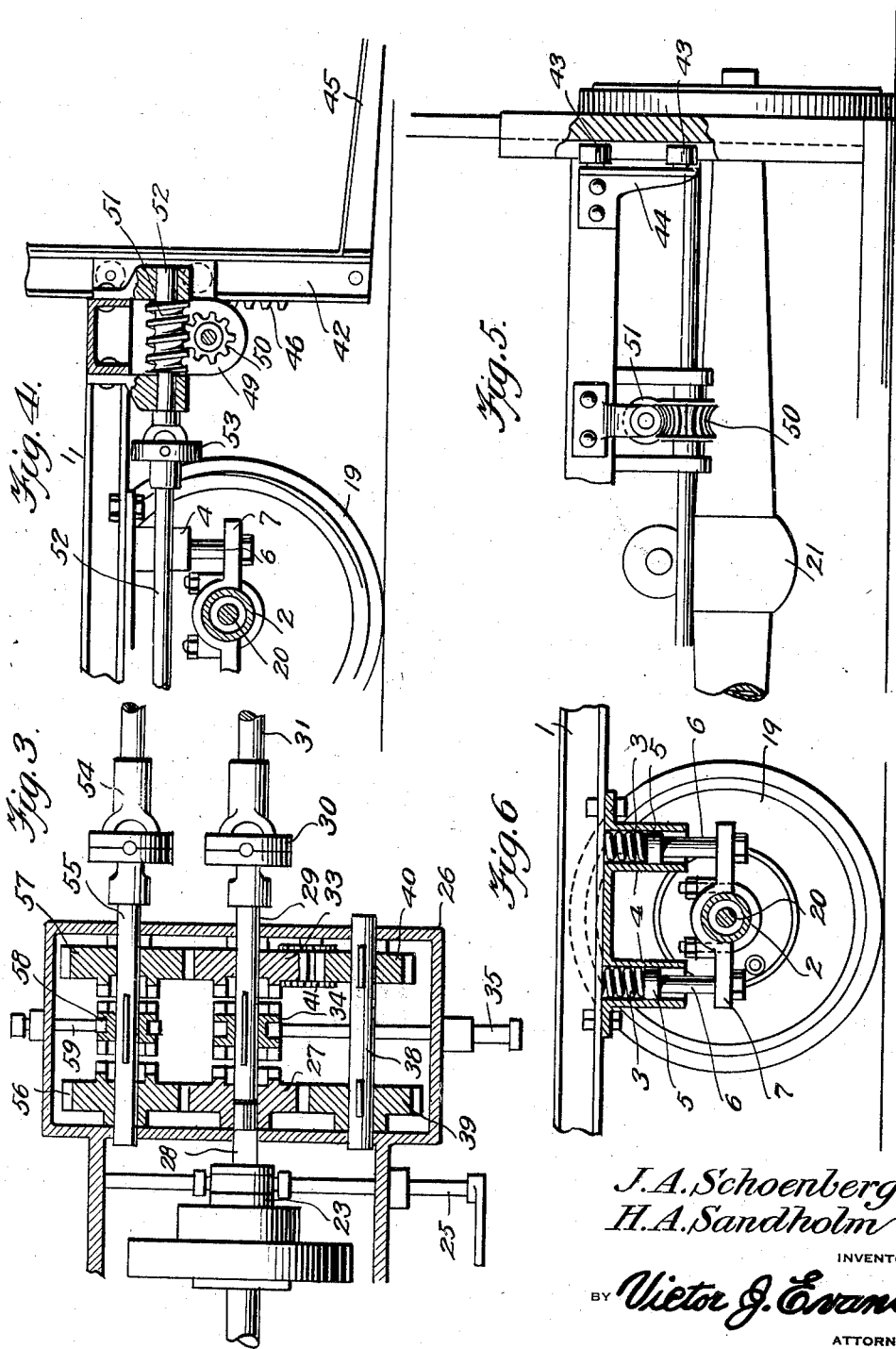

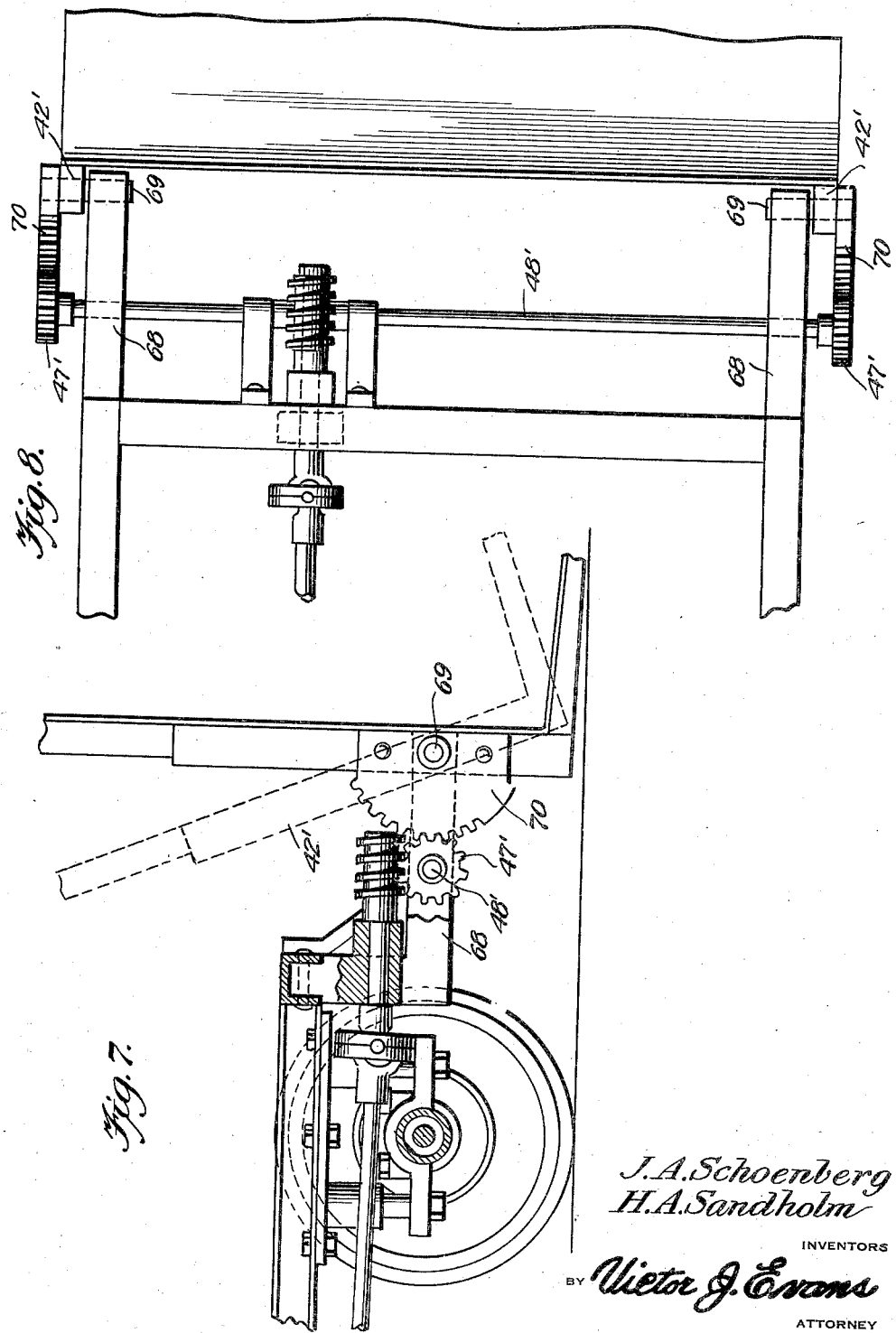

Patented June 10, 1930

1,763,542

UNITED STATES PATENT OFFICE

JAKE A. SCHOENBERG AND HAZEL A. SANDHOLM, OF SPOKANE, WASHINGTON

TRUCK

Application filed April 16, 1928. Serial No. 270,539.

This invention relates to improvements in trucks used in foundries, warehouses, etc., the general object of the invention being to provide a movable platform at the front of the truck, with means operated from the power plant of the truck for lifting the platform with a load thereon, so that heavy articles can be easily transported from place to place without the workmen lifting the articles upon the main platform of the truck.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a plan view of the improved truck.

Figure 2 is a side view thereof.

Figure 3 is a plan view, with parts in section, showing the transmission means for the drive shaft of the truck and for the shaft which operates the movable platform.

Figure 4 is a fragmentary elevation, with parts in section, of the front end of the truck and showing the worm means for raising and lowering the front platform.

Figure 5 is a fragmentary front view, with parts in section, showing the means for guiding the front truck.

Figure 6 is a fragmentary sectional view, showing the means for yieldably supporting a part of the main frame of the truck from the front axle thereof.

Figure 7 is an elevation, with parts in section, of the front end of a truck and showing a modification.

Figure 8 is a plan view of Figure 7.

In these views, the numeral 1 indicates the frame of the truck which is yieldably supported on the front axle 2 by the springs 3 arranged in the cylinder-like housings 4 depending from the frame and the pistons 5 having their rods 6 secured to the cross pieces 7 which are attached to said axle 2, the pistons fitting in the housings 4 and engaging the lower ends of the springs.

A single rear wheel 8 is journaled in the fork 9 which is connected to a rod 10 which passes through a cylinder 11 connected with the beam 12 centrally arranged on the rear part of the truck, said cylinder containing a spring 13 which presses against a piston 14 connected with the rod 10 and located in the cylinder and against the truck 15 on the top of the cylinder and through which the upper end of the rod 10 passes. A handle 16 is connected with the upper end of the rod so that the rod can be turned to move the wheel 8 to steer the truck. The spring 13 and the parts associated therewith act as yieldable means for supporting the rear end of the truck from the wheel 8.

A platform 17 is attached to the rear part of the frame and a seat 18 is attached to the rear end of the beam 12, this seat being so arranged that a person sitting thereon can readily reach the handle 16 to steer the truck.

The front wheels 19 are attached to the shafts 20 which are located in the axle 2 and the inner ends of these shafts are connected with the usual differential means, the housing of which is shown at 21.

The motor is shown at 22 and its shaft is provided with the usual clutch 23, said clutch being controlled from the pedal 24 through the connections 25, the clutch being arranged on the platform 17 where it can be reached by the foot of the operator sitting in the seat 18.

The transmission housing is shown at 26 and within said housing is located a gear 27 which is fixed to the shaft 28 to which a part of the clutch 23 is connected and a shaft 29 journaled in the housing is in alignment with the shaft 28 and has one end loosely fitting in the gear 27. The outer end of the shaft 29 is connected by the flexible joint 30 with the jack or drive shaft 31 which is connected with the differential means by the universal joint 32. A gear 33 is loosely arranged on that part of the shaft 29 within the housing and a clutch 34 is keyed to said shaft 29 between the gears 27 and 33 and has teeth thereon for engaging teeth formed on said gears. The clutch is shifted by the usual fork operated by the shaft 35 which is connected by a link 36 with the shift lever 37 carried by the platform 17 so that the clutch 34 can be shifted from a neutral position into engagement with either the gear 27 or 33.

A shaft 38 is journaled in the housing 26 and has attached thereto the gears 39 and 40, the gear 39 meshing with the gear 27 and the gear 40 meshing with an idle gear 41 journaled in the housing and also meshing with the gear 33. Thus it will be seen that when the clutch 34 is in a neutral position and the clutch 23 is in operative position, the shaft 28 will rotate the gear 27 in a clockwise direction, which will revolve the gear 33 in an anticlockwise direction so that the gear 40 will also be rotated in an anti-clockwise direction. This will cause the idle gear 41 to revolve the gear 33 in an anti-clockwise direction, but as said gear 33 is loose on the shaft 29, said shaft will not be rotated. Then by shifting the clutch 34 to the right in Figure 3, the shaft 29 will be connected with the gear 33 through the clutch 34 so that said shaft 29 will rotate with the gear 33 and thus the vehicle will be moved in one direction, as the shaft 29 is connected with the differential, as before described. By shifting the clutch 34 into engagement with the gear 27, the shaft 29 will be locked to the shaft 28 through said clutch and gear 27 so that said shaft 29 will rotate with the shaft 28 and thus the truck will be moved in an opposite direction. Thus it will be seen that the operator can cause the truck to move either rearwardly or forwardly by shifting the lever 37.

Channel-shaped uprights 42, suitably connected together, are guided for vertical movement at the front end of the truck through means of the rollers 43 carried by the brackets 44 attached to the front end of the truck at the corners thereof and a platform 45 has its rear end connected with the lower ends of these uprights, the top of the platform sloping forwardly and downwardly so that articles can be easily rolled or placed upon the platform when the same is resting upon the surface which supports the truck. The uprights are provided with the rack teeth 46 which are engaged by the toothed wheels 47 carried by a shaft 48 journaled in the hangers 49 at the front end of the truck.

The shaft 48 has attached thereto a worm 50 which meshes with the worm 51 carried by a shaft 52 journaled in the front end of the truck and to which a shaft 53 is attached by a flexible coupling 53'. The shaft 52 is connected by a flexible coupling 54 with a shaft 55 journaled in the housing 26 and on which are loosely arranged the gears 56 and 57 which mesh with the gears 27 and 33, as shown in Figure 3. A clutch 58 is keyed to the shaft 55 within the housing and has its teeth adapted to engage teeth on the gears 56 and 57. This clutch 58 is shifted from a neutral position into engagement with either the gear 56 or 57 by means of the shaft 58 connected with the clutch fork of the clutch 58 and which is rocked from the lever 60 on the platform 17 by the link 61 which connects the lever 60 with an arm on the shaft 59. Thus by manipulating the lever 60, the operator can cause the shaft 55 to rotate in either direction and thus cause the worm gearing to raise or lower the uprights 42 and the platform 45.

The wheels 19 are provided with the usual brake means 62, the brake means of the left wheel being connected by the cable 63 with a pedal 64 on the platform 17 and the brake means of the right hand wheel being connected by the cable 65 with the pedal 66 on the platform so that either the right or left hand wheel can be braked by stepping upon the proper pedal. We provide a third pedal 67 on the platform which is so attached to the cables that it will apply both brakes when the pedal is depressed.

From the foregoing it will be seen that we have provided means operated from the power plant of the truck for raising and lowering a platform at the front end of the truck which, when lowered, will rest upon the floor or other surface upon which the truck moves so that articles can be easily rolled or placed upon the platform and then lifted by the power means so they can be transported from place to place.

In the modification shown in Figures 7 and 8, the platform is tilted instead of being moved vertically, as in the first form. In this arrangement, the uprights 42' are pivotally connected with the front ends of the frames 68 attached to the front end of the truck, by the pivot pins 69 and a toothed quadrant 70 is rigidly connected with each upright, with the teeth thereof engaging the sprocket wheels 47' on the shaft 48' which is carried by the frames 68, this shaft 48' being driven from the power plant as before described.

Thus the platform with its uprights will be tilted when the shaft 48' is rotated through means of the sprockets and quadrants so as to raise and lower the platform.

In both cases, a screen or the like may be used to connect the uprights together to form a rear wall for the platform.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

In combination with a power driven truck, including the frame and power plant thereof, a pair of uprights, a back forming member connecting the uprights together, a platform having its rear edge connected with the lower ends of the uprights, the upper face of the platform sloping forwardly and downwardly, toothed portions on the uprights, means for movably connecting the uprights with the front end of the frame, a transversely arranged shaft journaled in the front part of the frame, sprockets on the ends of said shaft meshing with the toothed portions, a worm on the shaft, a longitudinally extending shaft journaled in the frame, a worm on the front end thereof meshing with the before mentioned worm, means, including clutch means, for driving said longitudinal shaft in either direction from the power plant and manually operated means for shifting the clutch means from a neutral position to either one of two positions to drive said shaft in either one direction or the other.

In testimony whereof we affix our signatures.

JAKE A. SCHOENBERG.
HAZEL A. SANDHOLM.